United States Patent [11] 3,625,866

| [72] | Inventor | Robert Mark Conde Tonawanda, N.Y. |
|---|---|---|
| [21] | Appl. No. | 844,666 |
| [22] | Filed | July 24, 1969 |
| [45] | Patented | Dec. 7, 1971 |
| [73] | Assignee | Union Carbide Corporation New York, N.Y. |

[54] ZEOLITIC DESICCANT BODIES AND PROCESS FOR PREPARING SAME
8 Claims, No Drawings

[52] U.S. Cl. .................................................. 252/455 Z
[51] Int. Cl. .................................................... B01j 11/40
[50] Field of Search ........................................ 252/455 Z, 463; 55/75

[56] References Cited
UNITED STATES PATENTS

| 3,106,593 | 10/1963 | Benesi ........................ | 55/75 UX |
| 3,234,147 | 2/1966 | Drost et al. .................... | 252/455 |
| 3,251,783 | 5/1966 | Keith et al. .................... | 252/463 |
| 3,255,027 | 6/1966 | Talsma .......................... | 252/463 UX |
| 3,268,295 | 8/1966 | Armbrust, Jr. et al. ........ | 252/463 X |

FOREIGN PATENTS

| 1,040,005 | 10/1958 | Germany ...................... | 252/455 Z |

Primary Examiner—Daniel E. Wyman
Assistant Examiner—C. F. Dees
Attorneys—Paul A. Rose, Thomas I. O'Brien, John C. LeFever and Richard G. Miller ABSTRACT: Adsorbent bodies suitable for use in drying refrigerants comprise an agglomerate core of zeolitic molecular sieve crystals having thereon over substantially its entire outer surface a hardened permeable coating of a diaspore-clay mineral mixture, said coating being hardened by having impregnated therein cured potassium silicate.

ZEOLITIC DESICCANT BODIES AND PROCESS FOR PREPARING SAME

The present invention relates in general to composite desiccant materials. More particularly, the invention relates to hardened agglomerates of crystalline zeolitic molecular sieves and to the process for preparing same.

Crystalline zeolitic molecular sieves occur naturally or are synthesized as fine crystalline bodies which for general utility in commmercial adsorptive or catalytic processes are usually formed into agglomerates, preferably possessing as high a degree of attrition resistance and crush strength as possible without unduly affecting the adsorptive properties of the sieves. One method of agglomerating these finely crystalline materials is by combining them with a clay binder as described in U.S. Pat. No. 2,973,327, issued Feb. 28, 1961 in the name of W. J. Mitchell et al. Whereas this prior technique provides a suitable agglomerate for a wide variety of industrial applications, it has been found that certain applications having a very low tolerance for attrition-produced particles or dust require a more strongly bound molecular sieve agglomerate.

In addition, it has been found that under some conditions, halogenated derivatives of ethane and methane employed as refrigerant gases are decomposed to some extent by a number of prior known molecular sieve agglomerates used as desiccants in the system.

It is therefore the general object of this invention to provide a molecular sieve agglomerate having improved resistance toward attrition and dusting, and a novel process for preparing same.

It is a further and more particular object to provide a molecular sieve agglomerate for use as a desiccant in refrigerant systems containing halogenated hydrocarbons whereby decomposition thereof is negligible and the sieve does not undergo significant mechanical breakdown or loss of crystallinity.

In accordance with the present invention, improved, attrition-resistant desiccant bodies are prepared by the process which comprises applying to the outer surface of a crystalline zeolitic molecular sieve agglomerate an essentially continuous coating of a finely divided mixture containing as its major constituent diaspore, and a clay mineral, contacting and impregnating at least the coating of the agglomerate thus formed with an aqueous solution of potassium silicate, drying the potassium silicate-impregnated agglomerate to remove a substantial portion of water therein, and thereafter firing the resulting composite agglomerate to set and harden the silicate and activate the molecular sieve.

The structure of crystalline zeolites may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example alkali metal and alkaline earth metal ions such as sodium, potassium, calcium and magnesium ions. One cation may be exchanged for another by ion-exchange techniques.

These zeolites may be activated to develop characteristic zeolitic molecular sieve properties by driving off substantially all of the water of hydration. The space remaining in the crystals after activation is available for adsorption of adsorbate molecules having a size, shape and energy which permits entry of the adsorbate molecules into the pores of the molecular sieves.

Any type of crystalline zeolitic molecular sieve may be employed in the present method to provide a hardened zeolitic molecular sieve agglomerate according to the invention. The selection of the particular sieve will depend on factors such as the apparent pore size of the material, and the end use of the agglomerate. For example, the pores must be at least large enough to receive the desired adsorbate molecule. In the case of refrigerant drying, the pores are preferably less than about 4.9 Angstroms in diameter so as to permit the inclusion of the water molecules and exclude the larger halogenated hydrocarbon molecules. This latter aspect is discussed more fully hereinafter in relation to removal of moisture from halogenated methane and/or ethane-containing refrigerants.

Among the naturally occurring crystalline zeolitic molecular sieves are erionite, chabazite, analcite, faujastie, clinoptilolite and mordenite. The natural materials are adequately described in the chemical art. Synthetic zeolitic molecular sieves include zeolite A (U.S. Pat. No. 2,882,243); zeolite T (U.S. Pat. No. 2,950,952); zeolite X (U.S. Pat. No. 2,882,244); zeolite E (U.S. Pat. No. 2,962,355); zeolite F (U.S. Pat. No. 2,996,358); zeolite M (U.S. Pat. No. 2,995,423); zeolite Y (U.S. Pat. No. 3,130,007); zeolite Z (U.S. Pat. No. 2,972,516); zeolite Q (U.S. Pat. No. 2,991,151); zeolite S (U.S. Pat. No. 3.054,657); and zeolite R (U.S. Pat. No. 3,030,181).

It is especially preferred that for use in drying halohydrocarbon refrigerants the agglomerates of this invention contain as the zeolitic molecular sieve the species now generally known as zeolite 3A. Zeolite 3A can be prepared from the sodium cation form of zeolite A by replacing at least 65 equivalent percent of the sodium cations with potassium cations by conventional cation exchange techniques. The preparation and characterization of sodium zeolite A is disclosed in detail in U.S. Pat. No. 2,882,243. The potassium cation-exchanged zeolite A, i.e., zeolite 3A, will adsorb molecules having critical diameters up to 3 Angstrom units.

The initial or starting agglomerate of molecular sieve crystals can comprise essentially only the sieve crystals pressed or otherwise compacted so that the agglomerate possesses sufficient handling strength. On the other hand, mixtures or blends of molecular sieve with binder materials such as clay, silicates or both clay and silicates can be employed. Thus, prior art agglomerates such as those disclosed in U.S. Pat. No. 2,973,327, Mitchell et al. can readily be employed in the present process since the novel composite agglomerate produced in such cases possesses improved strength properties without adverse effect upon adsorption properties. It is in fact preferred that the initial or starting molecular sieve agglomerate be one formed by the blending of clay with molecular sieve crystals.

In preparing such a clay containing starting agglomerate, the clay should be semiplastic or plastic in the presence of water at atmospheric temperatures and capable of acquiring a substantial "green" strength upon exposure for short periods of time to the drying process of the air. Examples of clays which may be employed for bonding molecular sieves without substantially altering the adsorptive properties of the molecular sieve are attapulgite, kaolin, sepiolite, palygorskite, kaolinite, plastic ball clays, clays of the attapulgite or kaolin types, bentonite, montmorillonite, illite, chlorite and bentonite-type clay. Preferably, the clay is one such as attapulgite having a pH (measured in aqueous dispersion) of not more than 8.5 and more preferably not more than 8. Some commercially available clays, because of acid treatment during preparation for the market, have pH values of as low as about 5.5. The slightly acid character of these clays has been found to be somewhat beneficial to the present process.

The amount of clay with respect to molecular sieve in the preferred starting agglomerate depends primarily upon the degree of ilution of the molecular sieve permissible in a desired use of the final product. For most purposes, a clay content of from 5 percent by weight of the final product is satisfactory.

Having provided an initial molecular sieve agglomerate, the essential second step of the present process is accomplished by applying to the surface of said agglomerate a relatively thin coating of a finely divided mixture of diaspore and a clay mineral, wherein diaspore is the major component. Concerning the composition of such coating mixture, blends of from about 78 to about 90 percent diaspore and from about 10 to about 22 percent clay mineral by weight have given particularly satisfactory results. When the amount of diaspore in the mixture to be applied as a coating is more than about 90 percent or less than about 78 percent by weight, the strength properties are retained, but the wet-attrition values are unacceptably high.

Diaspore is a hydrated alumina mineral ($Al_2O_3 \cdot H_2O$) commonly found with corundum, emery and bauxite, in Hungary, France and the U.S.A. (Arkansas, Pennsylvania, Missouri). According to the American system of nomenclature for alumina hydrates, diaspore is "beta-alumina monohydrate." Thus, it is to be distinguished from other oxides of aluminum such as the minerals hydrargillite or gibbsite ("alpha-alumina trihydrate"), boehmite ("alpha-alumina monohydrate"), bayerite ("beta-alumina trihydrate") and high-temperature phases such as corundum ("alpha-alumina"). Transformation from the beta-monohydrate directly to stable anhydrous alpha-alumina is observed when diaspore is heated to above about 500° C.

The clay component of the coating according to this invention may be any of those disclosed hereinabove for bonding molecular sieves. Again, attapulgite-type clays are preferred.

The average particles sizes of the diaspore and the clay mineral are not narrowly critical. It has been found that particles having a mesh size of less than about 50 mesh and preferably less than about 350 mesh (U.S. Standard Sieve) give optimum results. Larger particles can be suitably employed provided the method of contacting the coating material with the starting molecular sieve agglomerate involves sufficient mechanical force to further reduce the particle sizes of the coating materials. Thorough blending of the diaspore and clay mineral may be suitably accomplished in such apparatus as a cone blender or ribbon blender.

Several types of solids-solids blending apparatus are useful in the method of the invention for applying the blended diaspore-clay mineral coating to the agglomerate as well as for subsequent hardening or working of the coated body as, for example, by tumbling. Tumbling of the agglomerates in admixture with the coating particles in an apparatus having a "cement-mixer" type of rotational action has been found to be quite suitable. Other obvious means can of course by employed. For large-scale operation, for example, a coating pan can be advantageously employed. This equipment is commonly used by the pharmaceutical industry to coat tablets and in the food and confectionery industry for producing certain types of candy and chewing gum. The spherical agglomerates are rolled in the pan and the coating powder is periodically admitted. The motion of the agglomerates rubbing against each other helps to distribute the powder particles evenly over their surface. The pan or drum may be of a regular cylindrical shape or smoothly contoured. Usually, the pan is held and rotated at the end of a shaft inclined at an angle of about 60° from the horizontal. The interior surfaces of the pan may be smooth or have ribs or flights thereon. Hardening of the spheres by tumbling after the coating step may be done in this pan or in a separate rotating drum.

It has been found that very thin coatings of the diaspore-clay mineral blend are adequate, thus causing a minimum of dilution of the molecular sieve content of the final product. Coatings of at least about 1-micron thickness are usually required, with about 0.00025-inch coating thicknesses being preferred. Coatings having thicknesses above about 0.003 inch do not in general contribute any more to the improvement in attrition resistance than those less than 0.003 inch, but if desired, can be employed. With very thick coatings, i.e., about 0.03 inch or greater, some undesirable chipping of the final product due to differences in expansion properties of the central molecular sieve agglomerate and the outer coating may be observed.

After the diaspore-clay mineral coating has been applied, the resulting coated agglomerates are thereafter contacted or soaked in an aqueous solution of potassium silicate. The potassium metal silicate solution can suitably vary in its ratio of potassium oxide to silicon dioxide throughout the entire range of dispersibility. The presence of colloidal silica in suspension in the impregnating solution is not detrimental but has not been found to materially improve the product. Solutions containing alkali metal oxide to silicon dioxide ratios of 0.477 to 0.40 have been used with excellent results. Ratios lower than about 0.35 may be used but are not preferred because they tend to have increasing amounts of the silicon dioxide present in undissolved form.

The solid content of the silicate solution which is the sum of weight percent of the alkali metal oxide and the silicon dioxide in the solution may be from about 2 to about 4 weight percent. Lower than about 2 will not provide a sufficient introduction of silicate into the agglomerate to materially improve the crush strength, while more than about 4 leads to loss of adsorption capacity of the contained molecular sieve.

Within the above ranges of ratio of oxides and solid contents of the solution, the quantity of solution employed to impregnate a quantity of coated molecular sieve agglomerate may be in the range to provide from about 0.03 to about 0.07 pounds of solution solid per pound of agglomerate.

The contact of soaking of the agglomerates in the silicate solution may be either batch-type or continuous. When batchwise contact is employed, it is desirable to provide agitation for uniformity. Such agitation may be conducted by stirring the solution with moderation, to avoid breaking up the agglomerates.

Continuous contact is conveniently accomplished by percolating the solution through a chamber containing the agglomerates. In the continuous-contact method the concentration of the solids in the silicate solution may be in the lower concentration range and the solution can be replenished as the solids are depleted.

The immersion may be hot or cold, the advantage of heat being that shorter contact time may be employed but the disadvantage is the increased tendency toward alkali attack on the crystal structure of the zeolitic molecular sieve. Temperatures below about 60° C. are to be preferred to reduce this attack, particularly when the alkali metal oxide to silicon dioxide ratio is high.

The amount of silicate impregnated into the agglomerates is affected by all of the variables in the instant method and the time of contact. In some instances when using concentrated treating solutions, elevated temperatures, and very porous agglomerates, an immersion time of a few minutes is satisfactory. Longer contact times will generally result in an increase in the quantity of silicate entering the agglomerate and the distance of penetration of the silicate into the agglomerate. The time may extend to several hours or even several days, if desired, provided that the integrity of the agglomerate or the molecular sieve crystal is not affected. Increase in either or both the concentration and distance of the penetration will increase the final crush resistance of the product.

It is readily seen that by employing short immersion times in the practice of this invention, one can make a product having a hardened, abrasion-resistant exterior on the agglomerates which is entirely satisfactory for applications where this property is desired. On the other hand, longer contact times will effect a somewhat deeper hardening, which is preferred for maximum crushing resistance.

Following the immersion step, the agglomerates are separated from the treating solution and may, if desired, be given a brief water rinse which will remove just enough of the solution adhering to the outer surface of the agglomerates to eliminate the tendency of the agglomerates to adhere to each other.

After the agglomerates have been separated from the impregnation solution they may be fired. However, it is preferred to give them an intermediate drying to reduce their moisture content to the range of 15 to 22 weight percent. This drying may for example be done by air-blowing and can be aided by moderate heating in the temperature range of 180° to 350° F. This drying serves to substantially remove the intercrystalline water, thus reducing the heating load and steaming in the firing step.

The firing step completes the setting of the binder and at the same time removes the intracrystalline water of the crystalline molecular sieve, thereby activating it for adsorbent use. The firing may be done for example in a ventilated or forced-flow purge kiln to sweep out the evolved water vapor. The firing temperature required to set the binder and to activate the molecular sieve is in general within the range of about 1,050° to 1,220° F. By activation is meant driving off substantially all of the water of hydration of the molecular sieve crystals leaving the internal pores of the sieve free to accept adsorbate molecules.

Although we do not wish to be bound by any particular theory, it appears that the superior properties of the agglomerates of this invention are attributable to a significant degree to the particular nature of the diaspore-clay mineral coating applied prior to contact with the potassium silicate solution. The use of the blended coating composition permits the potassium silicate impregnating solution to penetrate well into the mass of the agglomerate. The "case-hardened" zone is less sharply defined and hence no extreme stresses are set up between the center and outer zone. For reasons about which no theories have yet been advanced, the results obtained by premixing the blended diaspore-clay mineral powder with the potassium silicate prior to application to the agglomerate core are not nearly as advantageous as those obtained from the practice of the invention.

In assessing the exceptional physical properties of the agglomerates of this invention, a number of test procedures were employed. They are as follows:

(I) Wet Attrition

A. Frigidaire Wet-Attrition Test

This test measures both the wet-attrition and the impact strength of the bodies. In accordance with the procedure, 100 ml. of desiccant beads are placed in a cylindrical 118-ml. glass container having dimensions 5.25 cm. in diameter and 6.35 cm. in height and provided with a tight-fitting closure. Trichloroethylene (50 ml.) is added to the desiccant beads and the closed container is subjected to a vertical reciprocating motion having an amplitude of 4.44 cm. and a frequency of 330 cycles per minute for 22.5 hours. The fines produced by attrition are thereafter washed from the beads with the trichloroethylene through a No. 100 U.S. Standard Sieve into a beaker, isolated from the trichloroethylene, heated to 350° C. to activate the sieve, and weighed. The weight obtained, expressed as a weight percent of the initial charge of desiccant beads is taken as the measure of the wet-attrition strength.

B. Paint Shaker Wet-Attrition Test

This test measures principally attrition wet strength. In accordance with the procedure, 136 ml. of desiccant beads are placed in a cylindrical 150-ml. container having a diameter of 4.4 cm. and a height of 10 cm. Sixty-eight ml. of trichloroethylene are added, the container closed, and subjected to a high-frequency swirling motion in a Model No. 30 Red Devil Paint Conditioner (manufactured by Red Devil Tools, Union, New Jersey) for 30 minutes. The fines produced by attrition are measured as described hereinbefore in the Frigidaire wet-attrition test.

(II) Crushing Strength Test

This test consists of placing a single agglomerate on a flat metal plate on a spring scale and increasing the loading force on a plate arranged to rest on top of the agglomerate until it is crushed. The crushing strength value (pounds) is an average for at least 25 activated agglomerates.

(III) Degassing

The degassing problem is one encountered by the commercial user who installs a quantity of the molecular sieve agglomerates in each refrigerator system. Degassing is simply the result of the adsorption of air by the activated sieve agglomerates before they are made a part of the sealed total refrigeration system. Such adsorbed gas shows up when, as a leak-testing procedure, the system is pumped down to a specified pressure and held thereat for a fixed length of time. The resultant desorption of the air from the agglomerates causes a pressure reading that might be construed as indicative of a leak (or as degassing from some other source) in the unit under test. Another problem may be the evolution of air which is adsorbed during normal refrigerator operation and then replaced by the water being slowly adsorbed. This air collects in the system as a noncondensable gas and interferes with the refrigerant flow. The test procedure is as follows:

An empty dryer tube, approximately 12 inches long and ⅜ inches in diameter, is attached to a vacuum pump and pumped on for 8 minutes. The pressure in the tube is indicated in microns ($\mu$) by means of a Hastings Vacuum Gauge. The tube is then shut off from the pump and the pressure reading is taken again after 10 minutes. An 8.0-g. sample of beads is then loaded into the tube and the same procedure is followed as above. The difference in these two readings minus the difference from the empty tube reading is the degassing value in microns.

(IV) Refrigerant Decomposition

This test is designed to determine the tendency of a zeolite desiccant to chemically decompose chlorodifluoromethane to form noncondensable gases primarily carbon monoxide. The procedure is as follows:

Approximately 2.5 g. beads are loaded into a stainless steel bomb, which is approximately 5 inches long by 1½ inches in diameter. The sample is activated by heating while under vacuum. Chlorodifluoromethane is introduced into the bomb by immersing the bomb in liquid $N_2$, and condensing the gaseous R–22. Further vacuum must be drawn to make sure all air is out of the sample. The bomb is immersed in a 60° C. water bath for three weeks, checking weekly by means of pressure increase to determine the amount of noncondensables formed by the reaction in the bomb. These measurements are reported as cc.'s of CO formed per gram of sample.

The following examples will serve to illustrate the invention:

Example 1

Spherical agglomerates were initially formed by dry-blending Type 3A molecular sieve crystals (80 parts by weight, anhydrous) and attapulgus clay (20 parts by weight, anhydrous), adding 21 parts by weight water, and forming spherical bodies by tumbling. The moisture content of the resultant bodies was 33 to 36 weight percent. Ground diaspore (4.5 weight percent loss of ignition) was blended with an attapulgite clay (15 weight percent loss on ignition) as a 85 percent-15 percent mixture, by weight. One-half gallon (about 4 pounds) of the above spherical agglomerates ("beads") were put into the tumbling apparatus (in the case, a "cement-mixer" type). With continued tumbling, 2 percent by weight, based on the weight of the bodies, of the above diaspore-attapulgite blend was added to the tumbling apparatus over a 2 minute period. The tumbling was continued for 1.5 hours. At the end of the tumbling step the coated beads were soaked for 6 hours at 70° F. in a solution of potassium silicate having a total solids content of 2.9 percent. This was equivalent to about 0.05 pounds of solution solids per pound of beads. The soaked beads were then drained and dried gently in warm air. The dried beads were fired at 625° C. for 30 minutes in a rotary kiln. The wet-attrition loss was determined to be 0.14 weight percent. The activated crush strength was measured as 10.2 pound.

Examples 2–12

Using spherical Type 3A molecular sieve agglomerates formed as in example 1, and following the procedure of that example, various blends of diaspore and clay were used to coat such agglomerates, followed by soaking in potassium silicate solution, drying and firing. Table A summarizes the results of this group of tests. It will be noted that the use of only diaspore in the coating (example 3) results in extremely high wet-attrition loss. It is also seen that very low wet-attrition losses and good crush strengths result when from about 10 to about 22 percent by weight of clay is blended with diaspore. Also, in the case of example 12, it is seen that substitution of a different type of alumina (boehmite) for the clay did not result in acceptable wet-attrition properties.

TABLE A

| Example Number | Coating composition, diaspore[b] | Weight, percent clay[a] | Activated crush strength, pounds | Wet-attrition loss, weight, percent | Degassing value microns |
|---|---|---|---|---|---|
| 3 | 100 | 0 | 8.2 | 8.2 | |
| 4 | 95 | 5 | 10.2 | 7.0 | |
| 5 | 90 | 10 | 9.0 | 0.5 | |
| 6 | 90 | 10 | 8.3 | 0.7 | |
| 7 | 85 | 15 | 9.1 | 0.4 | |
| 8 | 80 | 20 | 7.5 | 0.18 | |
| 9 | 80 | 20 | 9.4 | 0.15 | 126 |
| 10 | 80 | 20 | 11.0 | 0.16 | 126 |
| 11 | 75 | 25 | 10.0 | 4.9 | |
| 12 | 80 | c 20 | 9.2 | 2.7 | |

[a] Attapulgite-type.
[b] Diaspore from Missouri.
[c] In this test, a commercial boehmite alumina was substituted for the clay.

What is claimed is:

1. Process for preparing hardened agglomerates of crystalline zeolitic molecular sieve crystals which comprises forming an initial agglomerate comprising compacted molecular sieve crystals, applying a substantially uniform thin coating of a finely divided mixture comprising from about 78 to about 90 percent diaspore and from about 10 to about 22 percent clay mineral by weight to the said initial agglomerate, impregnating the diaspore-clay mixture coated agglomerate thus obtained with an aqueous potassium silicate solution having a solids content of from about 2 to about 4 weight percent, and thereafter firing the potassium silicate-impregnated agglomerate at a temperature within the range of from about 1,050° F. to about 1,220° F.

2. Process according to claim 1 wherein the initial agglomerate comprises molecular sieve crystals bonded with clay, said clay comprising from about 5 to about 35 weight percent of the initial agglomerate.

3. Process according to claim 2 wherein the particles of the diaspore-clay mixture applied to the initial agglomerate have a mesh size of less than 350 mesh, U.S. Standard Sieve, the potassium silicate solution has a potassium oxide-to-silicon dioxide ratio of from about 0.477 to about 0.40, and the quantity of potassium silicate solution employed to impregnate said coated agglomerate is from about 0.03 to about 0.07 pounds of solution solid per pound of agglomerate.

4. Process according to claim 3 wherein said coating has a thickness of from about 1 micron to about 0.003 inch.

5. Process according to claim 4 wherein the zeolitic molecular sieve crystals comprise zeolite A and the clay is an attapulgite-type clay.

6. Process according to claim 5 wherein the zeolite A is the potassium-exchanged form of zeolite A having uniform pore diameters of about 3 Angstroms.

7. The molecular sieve agglomerate prepared in accordance with the process of claim 1.

8. The molecular sieve agglomerate prepared in accordance with the process of claim 6.

* * * * *